Nov. 17, 1970   J. J. DE LUCA ET AL   3,541,486
SEGMENTED SUPERCONDUCTING MAGNET FOR A BROADBAND
TRAVELING WAVE MASER
Filed Oct. 2, 1968

INVENTORS
John J. DeLuca &
Larry E. Rouzer

BY

ATTORNEYS

United States Patent Office 3,541,486
Patented Nov. 17, 1970

3,541,486
SEGMENTED SUPERCONDUCTING MAGNET FOR A BROADBAND TRAVELING WAVE MASER
John J. De Luca, Silver Spring, and Larry E. Rouzer, New Carrollton, Md., assignors to the United States of America as represented by the Administrator of the National Aeronautics and Space Administration
Filed Oct. 2, 1968, Ser. No. 764,470
Int. Cl. H01f 7/22
U.S. Cl. 335—216        8 Claims

ABSTRACT OF THE DISCLOSURE

A superconducting magnet that produces a staggered magnetic field and is suitable for use with a broadband traveling wave maser. A plurality of pole pairs are mounted along a common axis. The pole pairs are separated or segmented by superconducting shields. In addition, a segmented return path is provided with each segment separated from its adjacent segments by a superconducting shield. The superconducting shields allow the magnets to be controlled so that there is no pulling effect between the magnets.

The invention described herein was made by the employees of the United States Government and may be manufactured or used by or for the Government for governmental purposes without the payment of any royalties thereon or therefor.

BACKGROUND OF THE INVENTION

Various superconducting magnet arrangements are available that produce a staggered magnetic field for broadband traveling wave masers. These magnets generally fall into two categories: (1) superconducting solenoids; and (2) Cioffi or "ideal" superconducting magnets. Superconducting solenoids consist of superconducting wire, usually NbTi or NbZr, 25% wound on a mandrel. The magnetic field generated when current passes through the wire is staggered by shaping iron pieces and placing them adjacent to a maser structure inside of the winding. Superconducting solenoids are generally employed where a maser magnetic field of higher than 3 kilogauss is required.

Cioffi or ideal superconducting magnets consist of a number of X-pole pairs incorporated into a single cylindrical housing. Superconducting wire is wound on coil forms—one winding per pole. Each coil form has a number of turns of wire wound around it so that a main coil and trim coils are formed. The trim coils comprise a few layers of turns wound over top of the main coil. The main coils are connected in series through the magnet poles and the trim coils are connected in pairs with the lead wires of the trim coils connected to individual power supplies. Current is supplied to the main coil to establish a nominal field of 1.6 kilogauss, for example. Current is then applied to each of the trim coils so that they add to or subtract from the field of their corresponding main coil so as to produce the required staggered field. Superconducting shields are placed across the gap between the pole pairs to prevent leakage and maintain the flux in the airgap.

While the foregoing superconducting magnets have been used to generate staggered magnetic fields for broadband traveling wave masers their use has not been entirely satisfactory. For example, superconducting solenoids have the disadvantage that the placement of the magnetic shims (iron pieces) in the magnetic field is extremely critical. In addition, because the shims are susceptible to vibration, they can modulate the maser's output. Cioffi or ideal superconducting magnets are difficult to trim because all pole pairs have a common return path. Hence, when the trim coils are trimmed they not only effect the field generated by their immediate or corresponding main coil, but they also effect the magnetic field generated by adjacent main and trim coils. Hence, it is extremely tedious to trim the overall field to a desired stagger. In addition, because of this adjacent coil effect and because of hysteresis in the iron, a particular staggered field is generally not easily repeatable. This invention is directed to alleviating the problems of Cioffi or ideal superconducting magnets when they are used to generate a staggered magnetic field for a broadband traveling wave maser.

It is an object of this invention to provide a new and improved superconducting magnet suitable for use with a broadband traveling wave maser.

It is another object of this invention to provide a superconducting magnet that produces a staggered magnetic field for a broadband traveling wave maser.

It is also an object of this invention to provide a superconducting magnet that produces a staggered magnetic field wherein the pulling effect between adjacent magnets is reduced or eliminated.

It is yet another object of this invention to provide a superconducting magnet that produces a staggered magnetic field for a broadband traveling wave maser that is easy to trim to provide the desired staggered magnetic field.

SUMMARY OF THE INVENTION

In accordance with a principle of this invention a new and improved Cioffi or ideal superconducting magnet suitable for generating a staggered magnetic field for a broadband maser is provided. A plurality of pole pairs are mounted along a common axis and are separated by superconducting shields to prevent magnetic pulling between adjacent magnetic fields. In addition, a segmented return path is provided with each segment separated from its adjacent segments by a superconducting shield so that individual segments are controllable to provide the desired staggered magnetic field.

It will be appreciated from the foregoing description that the invention is a rather uncomplicated means of preventing the undesirable effects of prior art Cioffi or ideal superconducting magnets when they are used to generate a magnetic field for a broadband traveling wave maser. Specifically, the invention provides a means for shielding the pole pairs of the magnets to prevent an interaction or "pulling" between adjacent magnetic fields. Hence, the magnetic pole pairs are easily trimmed to any desired field strength without an undesirable coupling action between adjacent magnetic fields.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein.

DESCRIPTION OF THE PREFERRED EMBODIMENT

Figure 1:
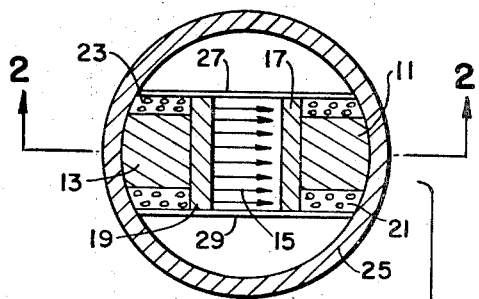
FIG. 1 is a cross-sectional diagram along lines 1—1 of FIG. 2 of a prior art staggered field superconducting magnet.
Figure 2:
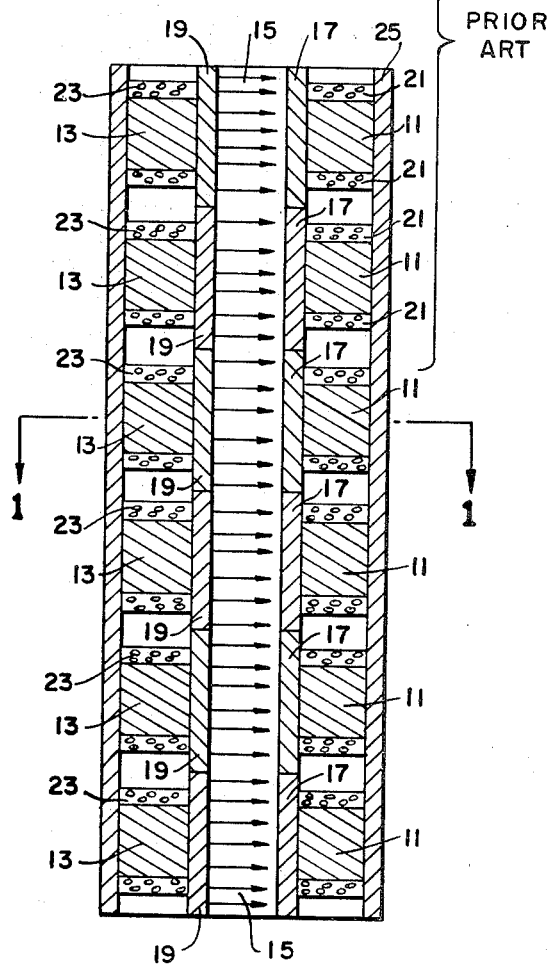
FIG. 2 is a cross-sectional diagram along lines 2—2 of FIG. 1 of a prior art staggered field superconducting magnet.

Turning now to the drawings wherein like reference numerals designate like parts throughout the several views, FIGS. 1 and 2 are pictorial diagrams of a prior art superconducting magnet suitable for use with a broadband traveling wave maser to generate a staggered field for the maser. The superconducting magnet illustrated in FIGS. 1 and 2 comprises a number of X-pole pairs mounted in and along the longitudinal axis of a single cylindrical housing. Each pole-pair comprises a first pole 11 and a second pole 13 coaxially mounted on opposite sides of an opening 15. A first pole face 17 is mounted on the inside of the first pole 11 and a second pole face 19 is mounted on the inside of the second pole 13. A magnetic field as represented by the arrows exists between the pole faces when the poles are magnetically energized.

First main and trim windings 21 are wound around the first pole; similarly second main and trim windings 23 are wound around the second pole. When an electric current flows through the main and trim windings (which are formed of superconducting wire) a superconducting magnetic field across the pole faces is generated. All of the foregoing structure is mounted inside of an outer cylindrical housing 25. Parallel superconducting shields 27 and 29 are mounted inside of the cylindrical housing on opposite sides of the opening 15 to prevent the magnetic field from straying out of the opening.

A broadband traveling wave maser (not shown) fits into the opening 15 and the magnetic field generated across the pole faces is staggered by controlling the current flow through the main and trim windings 21 and 23 to create a desired staggered magnetic field. It will be appreciated by those skilled in the art and others that a staggered magnetic field is necessary for the successful operation of the broadband traveling wave maser.

More specifically, in operation current is applied to the main and trim windings so a desired magnetic field across the pole faces is created. The current flow through the trim windings is controlled so that a desired staggered magnetic field is created. As discussed above, the primary disadvantage of the structure illustrated in FIGS. 1 and 2 is that any variation in the current applied to the trim coils changes the magnetic field created by that coil, resulting in a pulling effect between it and its adjacent magnetic fields. Hence, it is very difficult to trim a superconducting magnet of the type illustrated in FIGS. 1 and 2 to obtain a desired magnetic field.

Figure 3:
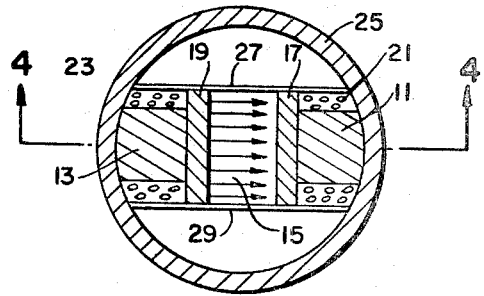
FIG. 3 is a cross-sectional diagram along lines 3—3 of FIG. 4 of a staggered field superconducting magnet suitable for use with a broadband maser made in accordance with the invention.
Figure 4:
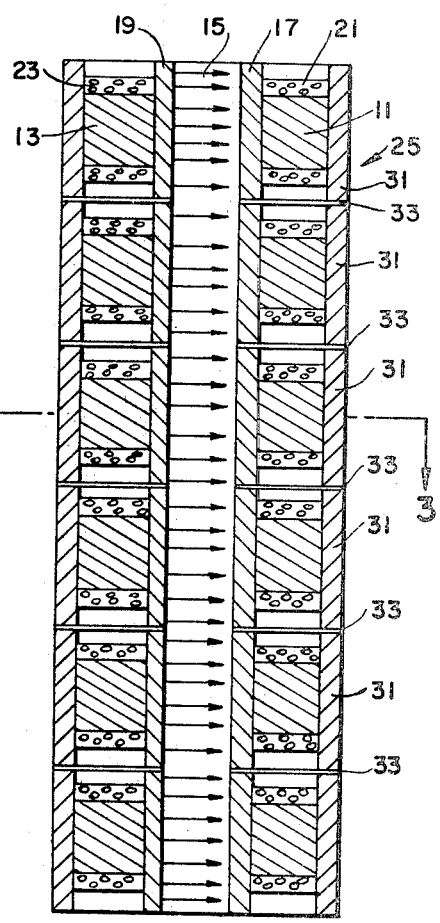
FIG. 4 is a cross-sectional diagram along lines 4—4 of FIG. 3 of a staggered field superconducting magnet suitable for use with a broadband maser made in accordance with the invention.

FIGS. 3 and 4 illustrate a preferred embodiment of the invention that overcomes the foregoing disadvantage, i.e., magnetic pulling between adjacent magnets is reduced or eliminated. Basically, the structure illustrated in FIGS. 3 and 4 is similar to the structure illustrated in FIGS. 1 and 2. That is, the structure illustrated in FIGS. 3 and 4 includes first and second poles 11 and 13; an opening 15; first and second pole faces 17 and 19; first and second main and trim windings 21 and 23; and a cylindrical housing 25.

The primary difference between the prior art structure and the inventive structure is separating the outer housing 25 into plurality of segments 31 equal in number to the number of X-pole pairs. Each segment is separated from its adjacent segments by a superconducting shield 33. In addition, each shield 33 extends from the outer edge of the cylindrical housing to the inner edge of the pole faces. Hence, the shields are washer-shaped and have a generally rectangular aperture 15.

It will be appreciated by those skilled in the art and others that segmenting the outer housing in the manner herein described eliminates the interaction or pulling between adjacent superconducting magnet segments when the device is tuned to provide a desired staggered field. Hence, the system can be easily tuned by controlling the application of power to the windings to provide a desired magnetic field. In addition, it is easy to reconstruct a desired magnetic field. With allowances for hysteresis, the magnetic field of each segment can be adjusted at will without altering the magnetic field of the other segments. Consequently, a required field is easily obtained and reobtained. Hence, the several hours of tuning required by prior art devices are eliminated.

What is claimed is:

1. In a segmented superconducting magnet for a traveling wave maser the improvement comprising:
   a segmented outer housing;
   a plurality of X-pole pairs having a common axis mounted in said housing; and
   superconducting shielding means mounted in said housing between the segments of said housing for shielding said plurality of X-pole pairs in a predetermined manner.

2. A segmented superconducting magnet for a traveling wave maser as claimed in claim 1 wherein said plurality of X-pole pairs equals in number the segments of said outer housing.

3. A segmented superconducting magnet for a traveling wave maser as claimed in claim 2 wherein said superconducting shielding means is mounted between adjacent X-pole pairs and adjacent segments of said outer housing.

4. A segmented superconducting magnet for a traveling wave maser as claimed in claim 3 wherein said outer housing is cylindrical and said superconducting shielding means are washer-shaped shields.

5. A segmented superconducting magnet as claimed in claim 4 wherein each X-pole pair comprises a pair of magnet poles mounted on opposite sides of said common axis and having a separation between said magnet poles.

6. A segmented superconducting magnet for a traveling wave maser as claimed in claim 5 wherein main and trim coils are wound about said magnet poles forming said X-pole pairs.

7. A segmented superconducting magnet for a traveling wave maser as claimed in claim 6 including a pole face mounted on the inner side of each magnet pole of each of said X-pole pairs.

8. A segmented superconducting magnet for a traveling wave maser as claimed in claim 7 including shielding means mounted parallel to said common axis to prevent the leakage of flux between opposite poles of said X-pole pairs.

References Cited

Journal of Applied Physics, vol. 30, No. 3, March 1962, pp. 875–879, an article by P. P. Coiffi.

Journal of Applied Physics, vol. 33, No. 4, August 1962, pp. 2522–2523, an article by W. G. Hilsen.

GEORGE HARRIS, Primary Examiner

U.S. Cl. X.R.

330—4